INVENTORS
WILLIAM A. BARNES
DONALD E. BROWN
BY
ATTORNEY

June 7, 1960    W. A. BARNES ET AL    2,939,348
JOINT CONSTRUCTION TOGETHER WITH MEANS
AND APPARATUS FOR PRODUCING SAME
Filed June 2, 1955    4 Sheets-Sheet 2

INVENTORS
WILLIAM A. BARNES
DONALD E. BROWN
BY Ray S. Pyle
ATTORNEY

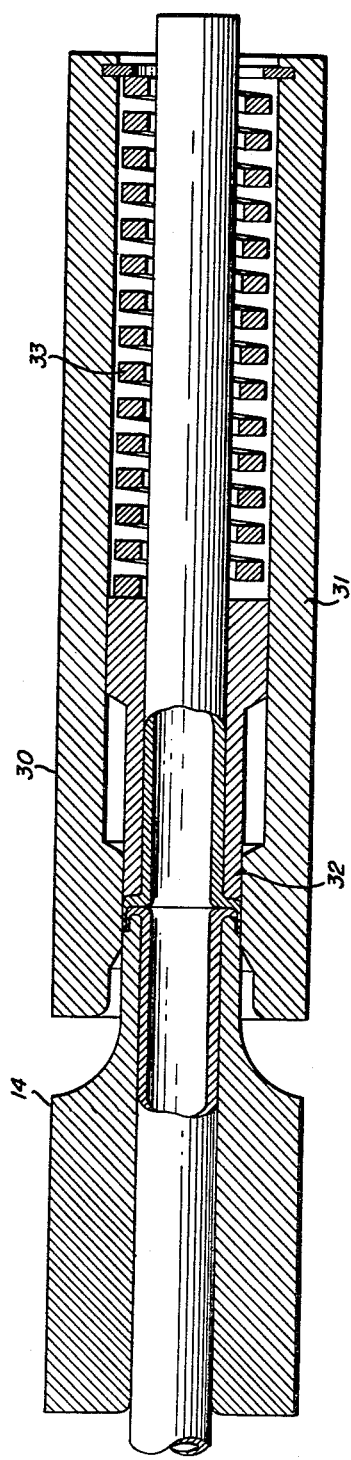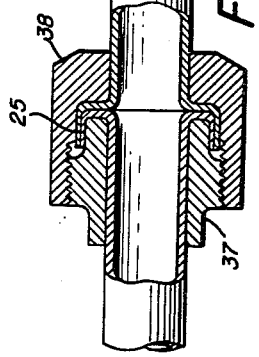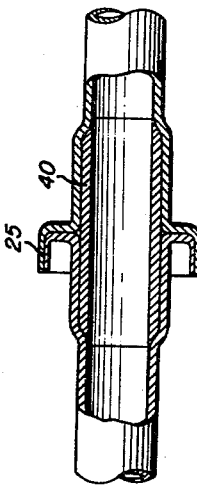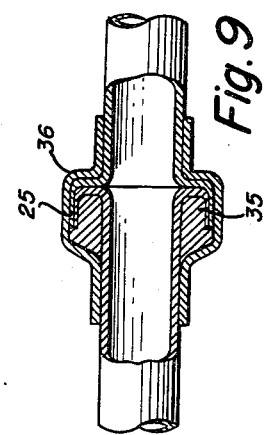

June 7, 1960 W. A. BARNES ET AL 2,939,348
JOINT CONSTRUCTION TOGETHER WITH MEANS
AND APPARATUS FOR PRODUCING SAME
Filed June 2, 1955 4 Sheets-Sheet 4

INVENTORS
WILLIAM A. BARNES
DONALD E. BROWN
BY Ray S Pyle
ATTORNEY

United States Patent Office 2,939,348
Patented June 7, 1960

2,939,348

JOINT CONSTRUCTION TOGETHER WITH MEANS AND APPARATUS FOR PRODUCING SAME

William A. Barnes, Utica, and Donald E. Brown, Clinton, N.Y., assignors, by mesne assignments, to Kelsey-Hayes Company, Detroit, Mich., a corporation of Delaware Filed June 2, 1955, Ser. No. 512,807

11 Claims. (Cl. 78—82)

This invention relates to coupling joint structures in general, and relates more specifically to a cold welded tube connector structure of improved physical properties, and to the method and tooling to achieve such structure.

This invention is an improvement upon and a continuation-in-part of application Serial No. 347,583, entitled "Joint Structure and Method of Making Same," now abandoned.

The union of two metallic members by the use of controlled flow of the metal structures at temperatures less than welding temperature, is a relatively recent accomplishment insofar as reducing the basic principles to a practical and usable procedure is concerned. It has long been known that metal can flow at room temperature under proper conditions of loading. It is possible that the uniting, or welding, of two metal objects by controlled application of high pressure at room temperature has been known. However, the reduction of this knowledge to a practical level has only recently been accomplished. United States Patent No. 2,522,408 was granted to Sowter for his development in cold pressure welding, and more recently additional Sowter United States Patents Nos. 2,707,821, 2,707,822, 2,707,823, and 2,707,824 have been issued.

Some metals will actually diffuse in such manner that a polished section of the union will not reveal a distinct junction between the two original members. Other metals have a distinct line dividing the original members. It has not definitely been determined what the nature of the union is in this line. It is definitely established, however, that an exceptionally strong union is produced between the two original members whether or not there is an actual diffusion. It is not the concern of the present invention whether or not the union is achieved by actual diffusion or some other phenomena of metal union, but rather with the results obtained and the means to achieve the results. Accordingly, in this specification and in the claims, reference will be made to a union between members caused by controlled flow of the metal structures, or to a cold weld. It is not intended that this invention should be limited by the choice of words to describe the junction between the members.

Although the theoretical background and physical phenomena taking place in the formation of a cold weld joint of this type are not yet fully understood, extensive research and experience indicate that the formation of the cold weld bond is produced by an outwardly moving metal flow between clean interfaces. Simple pressure is not enough. It has now been discovered that the interfaces must be pressed together very intensely over a surface which is not only in movement but which is fixed in contact, and is expanding in area. Although the instructions of the Sowter patents will produce good and acceptable welds, research and testing has led to the discovery of more basic requirements for successful cold pressure welding, generally. The metal flow once started must be continuous and severe in nature. Furthermore, the metal of one workpiece must not slide with respect to the mating interface of the other workpiece. For example, a very soft aluminum workpiece would tend to flow over the surface of a harder member such as most copper alloys, rather than flowing with the copper.

Such flow under controlled pressure probably does cause molecular and/or lattice diffusion or interchange between the metals of the two members or to reduce the interface to within molecular dimension, to effect an intimate contact or merging of the two metals into a mechanically strong solid phase welding bond.

In the cold butt welding of rods, wires, and other solid cross-sectional members, a reasonable degree of accuracy in axial alignment of the two members to be welded is required in order to prevent slippage of the members past one another. Such slippage past one another defeats the weld, because of the requirement of keeping the metal in contact under intense and continuing pressure such that the metal flow in the areas of contact are constantly expanding in a common plane to induce molecular mobility and an interlocking of the molecules of the interface.

Welding of such solid cross-sectional members has now become reasonably well controlled and such welding procedure is now commercially acceptable. However, welding of tubular members has heretofore presented a very serious problem because of the difficulty of maintaining the annular tube walls properly aligned throughout the entire cold welding period.

Furthermore, conventional butt welding of tubular members requires both members being joined to be of comparable wall thickness and internal diameter. Accordingly, appreciably different tube sizes cannot be joined by such conventional butt welding.

Therefore an object of this invention is to provide an improved union between any cold pressure weldable workpieces which can be provided with a plate-like section in abutment position.

Another object of the present invention is to provide a flanged tube union formed to produce a physical rigidity by reason of the shape thereof.

Another object of this invention is to provide a welded flange coupling union wherein the welded area is relatively large and is in shear with respect to either compression, bending or tensile pull on the welded members.

Another object of this invention is to provide tooling and a method of uniting tubular members by cold welding methods and with substantially no alignment difficulties.

Still another object of this invention is to provide a tube coupling union which may be made without the use of internal supporting and alignment arbors, but is adaptable to be reinforced by either external or internal auxiliary devices.

Still another object of this invention is to provide improved physical reinforcement of a tube joint once made.

And yet another object of this invention is to provide a cold pressure union of metal members in end-to-end relationship with lateral flange at the union, and a reinforcing clamp clipped tightly over the flange to hold the union against any tendency to separate.

A further object of this invention is to provide the clamp in air sealing relationship over the peripheral edge of the flange where the two metals are cold pressure welded and also exposed to atmosphere.

A still further object of this invention is to provide the clamp of insulating material, or metal with insulation material about the flange and clamp, to prohibit free flow of electrons from one metal to the other through the clamp.

Heretofore aluminum tubing has been difficult to use in high pressure fluid systems because any known means of welding resulted in softening of the material and possibilities of porosity. In cold pressure welding, the metal at the weld interface is actually hardened by cold work. Furthermore, hundreds of test welds and commercial use of cold pressure welding has demonstrated that such a weld is a hermetically tight seal even before it is welded extensively enough to be a satisfactory mechanically strong joint. Previous butt welding of tubing by cold pressure welding has entailed heavy equipment because of high pressures and close alignment necessary and internal arbors which had to be removed after welding. By this invention, reasonably light portable equipment may be used to weld together tube ends as may be available between components of a fluid system such as a refrigerator or aircraft hydraulic controls, because of simplicity of alignment and no need for internal arbors.

Therefore, another object of this invention is to permit the use of thinner walled tubing in refrigeration and other systems. Heretofore, the welding means available has necessitated tube wall of appreciable thickness in order to properly butt weld by electric resistance, arc torch or even cold pressure.

Another object of this invention is to provide a welded joint in a refrigeration system which combines a means to hold in position a strainer or restrictor tube or drying capsule as may be required. Heretofore, such items could not be located at the tube joints because of the heat required to make the welded joint, and practical means to locate the device.

Other objects and a fuller understanding of the invention may be had by referring to the following description and claims, taken in conjunction with the accompanying drawings, in which:

Figure 8 is a three-piece die construction having a third member to prevent inward bow of the tube as the weld proceeds;

Figure 9 is a section through a welded union wherein an auxiliary ring and seal are employed to give added strength and weather protection to the joint;

Figure 10 is a further type of joint reinforcement structure;

Figure 11 is an internal type of joint reinforcement structure;

Figure 1:
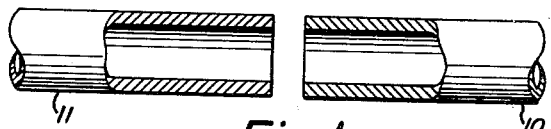
Figure 1 represents two tubular members to be joined.

In application Serial No. 347,583 there is set forth a type of tube joint and a means for physically reinforcing such joint. The tubular ends are shown slightly flaired. In the drawings of this case the preferred embodiment requires that the tube ends be flaired to a full 90 degree position. The exact degree of flair will depend upon the size and hardness of tubing as well as the particular equipment employed to perform the cold weld of the tubing. One method of providing a flaired structure as a starting construction for the present invention is to perform a butt weld with a radial weld flange and thereafter further unite and improve the joint according to the present invention.

Figure 2:
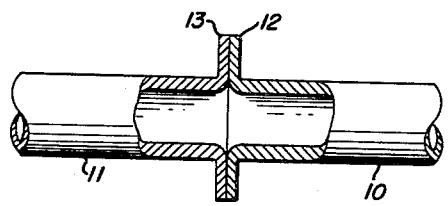
Figure 2 illustrates the tubes flanged and prepared for union.

In the drawings as set forth herein the present invention is set forth alone without reference to the possibility of performing a radial flange by butt welding and thereafter performing the present invention. In Figure 1 two tubular members 10 and 11 are illustrated in axial alignment to represent two workpieces to be united. In Figure 2 the workpieces have been flaired to present end flanges 12 and 13.

Prior to the present invention a butt weld of the tubular members would produce the flanges 12 and 13 as one welded flange and would depend upon the union along the transverse interface to hold the members united. Under conditions of high pressure, such a union is at the greatest disadvantage because the weld is in tension and the pressure in the united lines tends to pass outwardly along the very interface where the union has been made. Although cold welded butt welds are very successful when properly made, and have given exceptionally good service in actual use, nevertheless the conditions in a straight butt weld producing a single flange having such an interface is presenting the most difficult conditions possible for success of such a weld.

Figure 3:
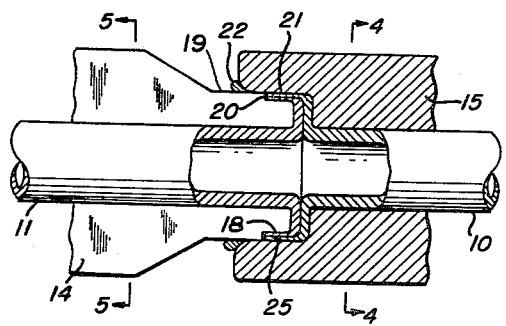
Figure 3 is a sectional view through the preferred die members employed to produce the union, and illustrates the dies at the end of the work stroke in producing the new union according to this invention.
Figure 6:
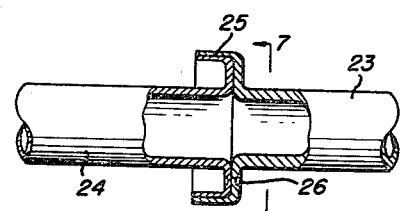
Figure 6 illustrates a finished union, produced as in Figure 3, wherein one of the tubbes is larger than the other.

Accordingly, whether the flanges 12 and 13 are allowed to remain separate as shown in Figure 2, or are produced as a single prewelded flange according to the teaching of Serial No. 347,583, and flanges are further united at the ends thereof and turned at an angle with respect to the plane of abutment as illustrated in Figures 3 and 6. Thus, a rim portion is formed, and preferably extends in the direction of the axis of the tubular members.

Figure 4:
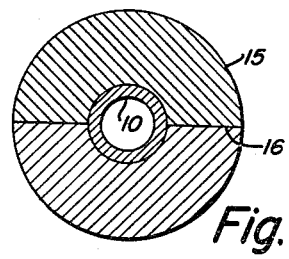
Figure 4 is a sectional view taken along line 4—4 of Figure 3.
Figure 5:
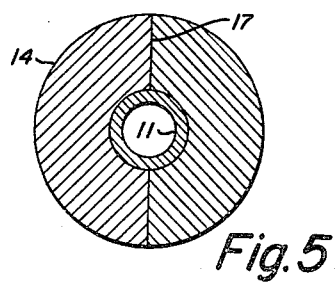
Figure 5 is a sectional view taken along line 5—5 of Figure 3.

The improved dies set forth in Figure 3 comprise a split male die 14, and a split female die 15, both of which may be separated for applying to and removal from the tubular workpieces. Splitting of the dies is not essential for short workpieces, but is highly desirable for long workpieces, and in the event that one of the tubular members is extending from a piece of machinery or other equipment and has no free end, one of the die members must be split. However, note that Figures 4 and 5 show that the dies have contact faces 16 and 17, respectively, and that these contact faces 16 and 17 are rotated with respect to one another. It has been found that split dies in which the contact faces are aligned will produce an unwelded failure area in the finished coupling.

The improved dies employed to produce the radial flange type of butt weld according to this invention provide a type of extrusion flow of the flange ends which keeps the two flanges in contact under intense and continuing pressure, such that by metal flow the areas of contact are constantly expanding in an abutment plane to induce molecular mobility and an interlocking of the molecules of the interface.

The male die 14 is provided with a first annular surface 18 and a second annular surface 19 joined by a shoulder 20. The die 15 has an internal annular surface 21 which closely fits the first annular surface 18 and is spaced from the second annular surface 19. However, the space between surfaces 19 and 21 is substantially less than the original thickness of the flanges 12 and 13. The exact amount of space between surfaces 19 and 21 will of necessity be determined for each particular tubular size and tube wall thickness, as well as the kind of metal and the hardness of the metal.

Figure 2A:
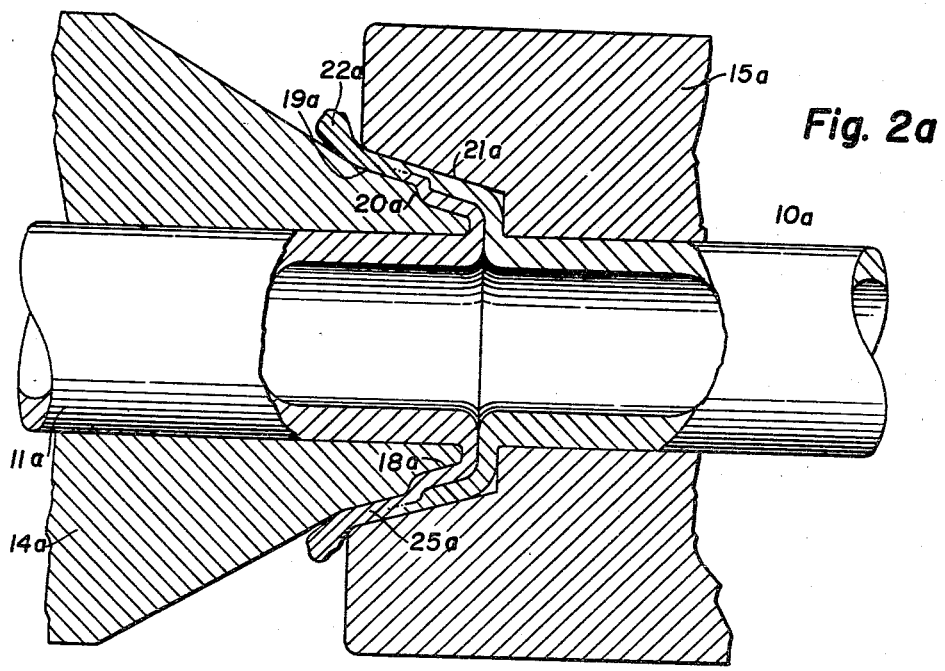
Figure 2A is a sectional view of a conical flange die construction employed to produce the union, and illustrates the dies at the end of the work stroke in producing the new union according to this invention.

There is no critical degree of closing required between the cylindrical die parts of Figure 3, and the excess portion of metal 22 is sheared away clean. However, in some instances, the flanges are variable in thickness. Accordingly, the conical construction shown in Figure 2A may be employed to advantage because of its inherent capacity to allow for different metal thicknesses. The excess metal may then be trimmed away by other means. Like parts in Figure 2A, which compare with Figure 3, are indicated by the same reference characters with the suffix "A" thereafter.

As a guide, the Sowter Patent 2,522,408 is referred to as a discussion of reduction requirements pertaining to cold pressure welding of two plate members. The spacing of the surfaces 19 and 21 is now within the realm of those skilled in the art of cold pressure welding. Such skilled technicians will also understand the necessity for producing clean interfaces prior to carrying forth the weld, such as by scratch brushing or other type of cleaning.

In producing the weld, as may be seen from the Figure 3, the male die is placed on one side of the flange area and the female die on the other. Relative movement is then caused to close the dies. Such closing movement will cause the ends of flanges 12 and 13 to be drawn and extruded sideways and flow as prescribed. An excess of metal will result from such drawing and extrusion and will be trimmed away from the finished weld by movement of the surface 21 over the surface 18. In Figure 3 such an excess glob of the flash metal is indicated by the reference character 22. Outwardly tapering relative surfaces, although practical, are exacting in closing requirements. With parallel surfaces, the closing position of the dies is not critical. From this showing, and the fact that a tube may be likened to a plate wrapped around an axis, it will be apparent that flat plate may be joined by the process and tooling of this invention.

Figure 6 illustrates tubular members 23 and 24 welded by the process and with the apparatus set forth in Figures 1 through 3. In Figure 6 the weld area is indicated by the reference character 25. Here it will be seen that the weld area extends substantially parallel to the axis of the two tubular members, and that such parallel positioning of the weld 25 produces an annular ring a spaced distance from the body of the tubes, and accordingly by its very physical position produces a rigidity in the weld union not available in conventional butt welding. Furthermore, the pressure within the tubular members does not have the splitting tendency between the welds which will otherwise be inherent with straight flange unions. Furthermore, the weld 25 will resist separation in shear rather than in tension, and accordingly will be considerably stronger than a fully flanged type union.

The Figure 6 illustrates a still further advantage which has been mentioned heretofore. The tube 24, as will be seen, is a larger size than the tube 23. According to the present invention variable size tubing and tubing of different wall thicknesses can be conveniently joined because the weld takes place at a distance from the surface of the tubular members. Such distance is an arbitrary distance which may be controlled according to conditions which are met in production.

Figure 7:
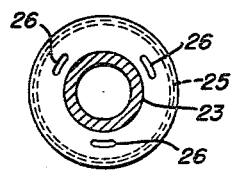
Figure 7 is a section taken along line 7—7 of Figure 6.

In Figure 7 of the drawings, a series of three spot welds 26 are shown in the radial section of the flange between the weld 25 and the body of the tubular members. Such spot welds may be produced according to the teachings of Sowter Patent 2,522,408. In view of the teaching in that patent, it will be seen that the indenting dies may conveniently be added to the corresponding abutment faces of the dies 14 and 15 to produce the welds 26 and further strengthen the weld area.

Figure 12:
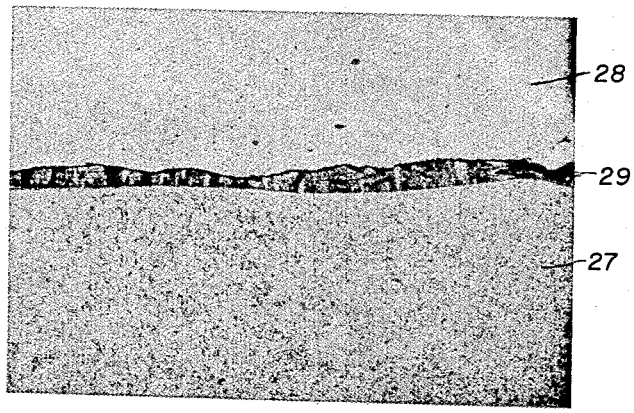
Figure 12 is a photomicrograph of a copper to aluminum weld produced by heat methods.
Figure 13:
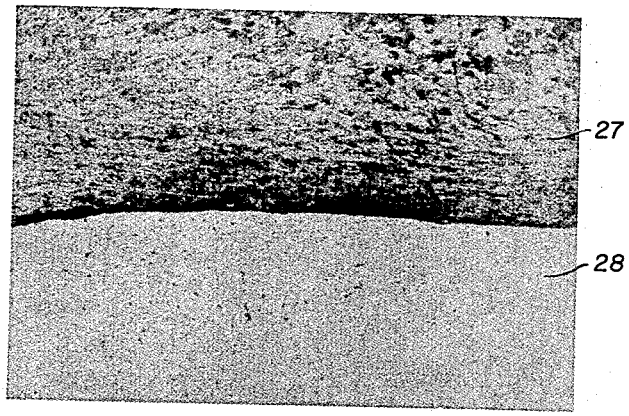
Figure 13 is a photomicrograph of a similar union between copper and aluminum produced by the cold weld process as heat treatment according to the principles of this invention.

Figures 12 and 13 are two photomicrographs illustrating a discovery which has increased the usefulness of cold pressure welds immeasurably. In Figure 12 a copper tube section 27 and an aluminum tube section 28 are joined by conventional heat methods and have produced an interfacial alloy area 29 which is extremely brittle and under heat conditions promotes the rapid increase of the area and increase of brittleness of the weld. Growth of the area is accelerated when the weld area is subjected to high temperature operating or to heat treatment conditions.

In contrast, the Figure 13 illustrates a typical union between a copper and aluminum member produced by the cold welding methods set forth in regard to this case. After the pressure welding steps as outlined herein, each of the two examples set forth in Figures 12 and 13 were subjected to a three minute heat treatment at 750° F. The heat produced weld of Figure 12 was not relieved in any respect, and in fact the alloy area 29 was somewhat enlarged and embrittled. The section shown in Figure 13, on the other hand, produced no visible alloy area whatsoever, and in fact was somewhat toughened and increased in tensile strength, evidently from relief of work hardening.

It has been found that while practicing the present invention, the use of the male and female dies 14 and 15 as set forth in Figure 3 is quite satisfactory, but that sometimes the tube 10 contacted by the female die 15 will tend to bulge inwardly into the tubular passageway under severe welding conditions. Accordingly, the three-piece composite die of Figure 8 has been provided to aid in preventing such collapse. In Figure 8 the male die 14 is substantially identical to that shown in Figure 3, and the female die, represented generally by the reference character 30, is composed of an external portion 31 and a tube supporting internal section 32. A strong coil spring or other resilient means 33 urges the inner supporting die 32 tight against the flange 12 during the entire process of moving the female welding section 31 and the male die 14 relatively together to perform the weld action as previously described with respect to the Figure 3. In the event that this three-piece tooling must be made in segments for removability from long workpieces, the coil spring 33 may be replaced with other resilient means.

In Figures 9 through 11 there are illustrated three convenient methods of mechanically reinforcing and protecting the united structures after producing the weld 25. Such additional protection is sometimes desirable for extreme use conditions. In Figure 9 an annular metallic ring 35 is caused to fill the area within the weld 25 and provide a shoulder beyond the weld. A cover retainer 36 is then employed to clamp the ring 35 in position. Retainer 36 may be sealed weather-tight to the outer surfaces of the tubular members, or made of weather sealing material if desired. Ring 35 is placed on the tube before flanging and welding and is then slipped into place after weld 25 has been accomplished.

In Figure 10 a male and a female threaded member 37 and 38 respectively, similar to corresponding members of conventional tubing fittings, are employed to provide a mechanical retainer encompassing the external surfaces of the weld and radial section of the flange to give physical strength to the joint while depending entirely upon the weld 25 for completely sealing the joint. Such structure may be exceptionally desirable in light weight tubing joints serving under severe conditions.

In Figure 11 internal tubular section 40 is positioned to bridge between the ends of the tubes before the weld 25 is produced. As illustrated, the ends of the tubes may be flaired at the junction area in order to maintain a continuous internal diameter. Such internal bridge tube adds strength without exposed or visible external reinforcement.

Refrigerator systems have commonly employed conventional expansion valves between the high and low pressure areas of the system to control the expansion of the refrigerant into the evaporator. It is now common practice to use a length of capillary tubing for such purpose. The resistance to the flow of the refrigerant through the capillary tube serves as an expansion valve. It is desirable, and sometimes actual practice, to insert these capillary tubes as restrictors inside of the larger tubing of the system. In other installations they are a part of the fluid conveying system and are as much as several feet long.

Further, because refrigeration systems can be quickly ruined by dirt particles which lodge in capillary tubes, most systems use a separate strainer assembly. Heretofore a strainer device has been made with tubular ends for welding or soldering into a system. A later development advocates the coil end of a refrigeration system to be expanded to receive the strainer or filter and then swaged down to capillary size thus eliminating one solder joint with its consequent risk of leakage or dirt inclusions.

Water absorbing capsules are likewise located in most systems by some means to install and hold the capsule permanently located.

Figures 14, 15:
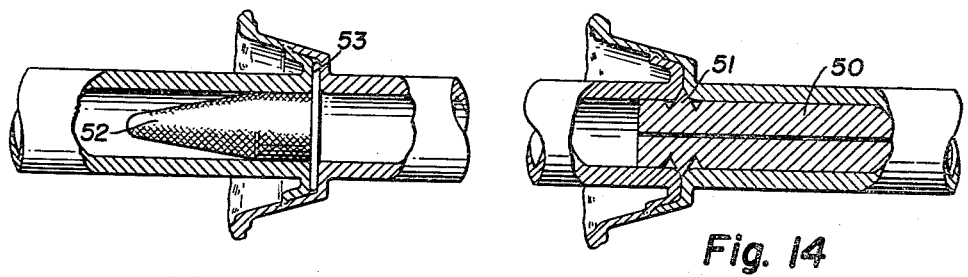
Figure 14 is an illustration of the incorporation of a capillary tube into a fluid system; and, Figure 15 is an illustration of the incorporation of a strainer into a fluid system.

To illustrate the improved method of the present invention, Figure 14 is a drawing of a capillary insert 50 located at the weld joint made according to the principles set forth herein. The location and mounting of such a capillary fluid tight to prevent shifting of the insert 50 and to seal against bypassing, is very simple and effective when incorporated by the principles of this invention. The capillary insert 50 is provided with a radial flange 51. One practical means is to roll the insert to form the flange 51. If such rolling is carried out after the capillary passageway has been created, a needle may be temporarily inserted during the rolling action.

Because the joint structure of the present invention does not employ heat which would in any way disturb the capillary insert 50, either physically or mechanically, the flange 51 may be inserted between the abutting flanges of the tubular members prior to carrying out the rim flange welding procedure set forth, and will thereby be permanently incorporated into and made a part of the system and be effectively sealed against bypassing.

Likewise straining and drying devices may be incorporated at the union. In Figure 15 a strainer device 52 is illustrated in such position. The strainer is provided with radial flange 53 and is positioned between the abutting tubular members as described in connection with the capillary insert 50. A drying capsule may be likewise constructed and installed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. Tooling to produce a rimmed tube coupling joint between flanged cold weldable tube members, comprising, a male die having a nose portion with a central opening therethrough to closely encompass a tube to be united, said nose portion having a front end wall to abut and support the flange of the tube extending from the male die, a first annular wall extending rearwardly from said nose portion, a second annular wall extending rearwardly from the first annular wall, said second annular wall having a larger diameter than said first annular wall, a female die having an interior cavity defined by an annular wall proportioned to fit over said second annular wall of the male die in shearing relationship, said nose of the male die serving to support the flanges adjacent the tubes, and the first annular male surface and the annular female surface passing at a closely spaced distance to draw and extrude the outer portion of the flanges to cause a severe drawing extrusion of the mated members therebetween and a moving flow between the abutting interfaces which interfaces are not only movement but which are fixed in contact and expanding in area, said drawing extrusion being sufficient in its action and reaction on the abutting flanges to cause such an interfacial metal flow and extensive action at the interface as to create a solid phase welding bond thereat.

2. Cold weld tooling to produce a cold welded rim union on the periphery of a flanged joint between cold weldable tube members, comprising, a first and a second die member closable with force upon a portion of the flanged joint, said first and second die members each having a central opening therethrough to closely encompass a tube to be united, the first and second dies each having a nose portion ending in an end wall extending transversely to the axis of said central opening to abut and support the flange of a tube extending therefrom, said first and second die members each having a substantially cylindrical external surface in the area of said nose portion, said first and second die members proportioned to permit the peripherical edge of the mated flanges to extend therefrom, and a third die member adapted to pass over the surface of the first die member with a wiping movement at a spaced distance less than the combined thickness of the mated flange members in the joint, whereby the flange is supported during the wiping action to prevent transmission of working forces to the tube wall and whereby the edge of the flanged joint is turned into a rim at an angle to the plane of the interface between the flanges and cold welded into a rim portion.

3. Tooling a produce a rimmed tube coupling joint between flanged cold weldable tube members, comprising, a male die composed of separable sections, said male die having a nose portion with a central opening therethrough to closely encompass a tube to be united, said nose portion having a front end wall to abut and support the flange of the tube extending from the male die, a first annular wall extending rearwardly from said nose portion, a second annular wall extending rearwardly from the first annular wall, said second annular wall having a larger diameter than said first annular wall, a female die composed of separable sections, said female die having an interior cavity defined by an annular wall proportioned to fit over said second annular wall of the male die in shearing relationship, said male and female dies orientated to present the interfaces of the die sections out of register, said nose of the male die serving to support the flanges adjacent the tubes, and the first annular male surface and the annular female surface passing at a closely spaced distance to draw and extrude the outer portion of the flanges to cause a severe drawing extrusion of the mated members therebetween and a moving flow between the abutting interfaces which interfaces are not only in movement but which are fixed in contact and expanding in area, said drawing extrusion being sufficient in its action and reaction on the abutting flanges to cause such an interfacial metal flow and extensive action at the interface as to create a solid phase welding bond thereat.

4. An apparatus for pressure welding two tubular members having preformed flanges abutted and extending radially from the tubes, comprising, a welding die having a forward locating surface abuttable against the mated flanges as a supporting and locating surface, said welding die having a coining surface extending at an angle from said locating surface at a distance from the tubular members, and a female die arranged to pass over the coining surface in a spaced relationship, said female die and said coining surface jointly defining a longitudinally closable extrusion chamber, whereby the flanges of the tubes may be extended beyond the said locating surfaces and therefore will be turned and compressed, and then extruded from the closing chamber to cause a pressure weld of the flanges and create a cup formation thereof.

5. An apparatus for pressure welding two tubular members having preformed flanges abutted and extending radially from the tubes, comprising, a first die having a tube receiving opening therethrough with a forward workpiece location surface abuttable against the said flange of a workpiece tube fitted into said die, a second die having a like opening and location surface to hold and support the other said workpiece, said location surfaces of the first and second dies closable along a predetermined path between an opened workpiece receiving position and a closed workpiece contact position, in said closed position said location surfaces spaced a distance equal to the combined thickness of the workpiece flanges, said location surfaces disposed essentially transverse to said path, said first die having a first coining surface extending from the location surface thereof in a direction transverse thereto and away from said second die, said second die having a coining surface extending from the location surface thereof in a direction transverse thereto and toward said first die, said coining surface of the second die relatively movable transversely to said location surfaces at a spaced distance from said first coining surface but less than said combined thickness of the flanges.

6. In the apparatus of claim 5, said coining surface of the first die being stepped from a small to a larger diameter and the large diameter portion being closely fitted to the size of the coining surface of the second die, whereby the smaller portion and the second die create a longitudinally closing extrusion chamber and the larger diameter portion causes a pinching off of excess material.

7. In the apparatus of claim 5, said coining surface of the first die extending in a convex generally coined form and the coining surface of the second die extending in generally concave conical form mated to nest with said first die in spaced relationship when the said locating surfaces are seated on workpieces, whereby an extrusion chamber of open end is created to compress and weld the outer portions of mated flanges.

8. An apparatus for pressure welding two tubular members having pre-formed flanges abutted and extending radially from the tubes, comprising, a first die having a tube receiving opening therethrough with a forward workpiece locating surface abuttable against the said flange of a workpiece tube fitted into said die, a second die having a like opening and location surface to hold and support the other said workpiece, said location surfaces of the first and second dies closable along a predetermined path between an opened workpiece receiving position and a closed workpiece contact position, in said closed position said location surfaces spaced a distance equal to the combined thickness of the workpiece flanges, said location surfaces disposed essentially transverse to said path, said first die having a fixed coining surface, extending from the location surface thereof in a direction transverse thereto and away from said second die, said second die having a separate coining surface member extending in a direction transverse thereto and toward said first die, said separate coining surface of the second die relatively movable independent of said location surfaces thereof and transversely to said location surfaces at a spaced distance from said fixed coining surface but less than said combined thickness of the flanges.

9. In the apparatus of claim 8, said fixed coining surface of the first die being stepped from a small to a larger diameter and the large diameter portion being closely fitted to the size of the coining surface of the second die, whereby the smaller portion and the second die create a longitudinally closing extrusion chamber and the larger diameter portion causes a pinching off of excess material.

10. Tooling to produce a rimmed tube coupling joint between flanged cold weldable tube members, comprising, a male die having a nose portion with a central opening therethrough to closely encompass a tube to be united, said nose portion having a front end wall to abut and support the flange of the tube extending from the male die, a first annular wall extending rearwardly from said nose portion, a second annular wall extending rearwardly from the first annular wall, said second annular wall having a larger diameter than said first annular wall, a female die having an interior cavity defined by an annular wall proportioned to fit over said second annular wall of the male die, said nose of the male die serving to support the flanges adjacent the tubes, and the first annular male surface and the annular female surface passing at a closely spaced distance to draw and extrude the outer portion of the flanges to cause a severe drawing extrusion of the mated members therebetween and a moving flow between the abutting interfaces which interfaces are not only in movement but which are fixed in contact and expanding in area, said drawing extrusion being sufficient in its action and reaction on the abutting flanges to cause such an interfacial metal flow and extensive action at the interface as to create a solid phase welding bond thereat.

11. Tooling to produce a rimmed tube coupling joint between flanged cold weldable tube members, comprising, a male die composed of separable sections, said male die having a nose portion with a central opening therethrough to closely encompass a tube to be united, said nose portion having a front end wall to abut and support the flange of the tube extending from the male die, a first annular wall extending rearwardly from said nose portion, a second annular wall extending rearwardly from the first annular wall, said second annular wall having a larger diameter than said first annular wall, a female die composed of separable sections, said female die having an interior cavity defined by an annular wall proportioned to fit over said second annular wall of the male die, said male and female dies oriented to present the interfaces of the die sections out of register, said nose of the male die serving to support the flanges adjacent the tubes, and the first annular male surface and the annular female surface passing at a closely spaced distance to draw and extrude the outer portion of the flanges to cause a severe drawing extrusion of the mated members therebetween and a moving flow between the abutting interfaces which interfaces are not only in movement but which are fixed in contact and expanding in area, said drawing extrusion being sufficient in its action and reaction on the abutting flanges to cause such an interfacial metal flow and extensive action at the interface as to create a solid phase welding bond thereat.

References Cited in the file of this patent

UNITED STATES PATENTS

| | | |
|---|---|---|
| 199,180 | Bicknell | Jan. 15, 1878 |
| 376,750 | Murphy | Jan. 24, 1888 |
| 473,139 | Bernhart | Apr. 19, 1892 |
| 647,469 | Brown et al. | Apr. 17, 1900 |
| 647,470 | Brown | Apr. 17, 1900 |
| 872,168 | Clark | Nov. 26, 1907 |
| 1,176,303 | Layman | Mar. 21, 1916 |
| 1,494,693 | Loi | May 20, 1924 |
| 1,658,100 | Rijns | Feb. 7, 1928 |
| 1,928,910 | Riemenschneider | Oct. 3, 1933 |
| 1,966,053 | Squires | July 10, 1934 |
| 2,016,905 | Nathan | Oct. 8, 1935 |
| 2,077,035 | Byedeson | Apr. 13, 1937 |
| 2,284,754 | McGarry | June 2, 1942 |
| 2,479,755 | Martin | Aug. 23, 1949 |
| 2,598,191 | Penn | May 27, 1952 |
| 2,639,634 | Sowter | May 26, 1953 |
| 2,669,138 | Sowter | Feb. 16, 1954 |
| 2,707,821 | Sowter | May 10, 1955 |
| 2,886,992 | Barnes et al. | May 19, 1959 |

FOREIGN PATENTS

| | | |
|---|---|---|
| 667,937 | France | July 1, 1929 |
| 1,081,047 | France | Dec. 15, 1954 |